(12) United States Patent
Gutman et al.

(10) Patent No.: US 6,186,486 B1
(45) Date of Patent: Feb. 13, 2001

(54) JOUNCE BUMPER PLATE

(75) Inventors: Ralph M. Gutman, Centerville; David Adolph Bobinger, Middletown; Douglas H. Markwood, Xenia, all of OH (US)

(73) Assignee: Delphi Technologies, Inc., Troy, MI (US)

( * ) Notice: Under 35 U.S.C. 154(b), the term of this patent shall be extended for 0 days.

(21) Appl. No.: 09/365,084

(22) Filed: Jul. 30, 1999

(51) Int. Cl.$^7$ .................................................. B60G 13/00
(52) U.S. Cl. ........................ 267/220; 267/292; 267/153; 188/322.12; 188/322.17
(58) Field of Search ................ 188/322.11, 322.12, 188/322.16, 322.17; 280/668; 267/293, 140.3, 220, 294, 33, 292, 153

(56) References Cited

U.S. PATENT DOCUMENTS

| | | | |
|---|---|---|---|
| 2,100,464 | * 11/1937 | Almen et al. ........................ | 267/161 |
| 2,356,310 | * 8/1944 | Gass ...................................... | 267/161 |
| 2,431,120 | * 11/1947 | Howe ................................... | 267/161 |
| 2,747,166 | * 5/1956 | Hoffarth ............................... | 267/161 |
| 3,114,388 | * 12/1963 | Hoen ................................... | 267/161 |
| 4,568,067 | 2/1986 | Iwata . | |
| 4,711,463 | 12/1987 | Knable et al. . | |
| 4,721,325 | 1/1988 | Mackovjak et al. . | |
| 4,747,474 | 5/1988 | Kimura et al. . | |
| 4,771,996 | * 9/1988 | Martinez, Jr. et al. .............. | 267/220 |
| 4,884,665 | 12/1989 | Parker et al. . | |
| 5,150,886 | * 9/1992 | Hamberg et al. ..................... | 267/227 |
| 5,158,269 | 10/1992 | Hein et al. . | |
| 5,275,389 | 1/1994 | Pinch et al. . | |
| 5,308,104 | 5/1994 | Charles . | |
| 5,487,535 | 1/1996 | Carter et al. . | |

* cited by examiner

Primary Examiner—Robert J. Oberleitner
Assistant Examiner—Devon Kramer
(74) Attorney, Agent, or Firm—Robert M. Sigler

(57) ABSTRACT

A jounce bumper plate for a damping module of a type commonly employed automotive suspension system having a hydraulic cylinder with an upper end cover, a piston rod slidably extending from the upper end of the cylinder and ajounce bumper mounted upon the piston rod. The jounce bumper plate mounted on an upper end of the cylinder and includes a central bore therethrough to allow slidable passage of the piston rod, and includes a series of arches extending about the outer periphery of the plate. The arches increase in curvature from the central bore to the outer periphery, thereby forming gaps between the jounce bumper plate and the associated hydraulic cylinder to facilitate the expulsion of moisture and contaminants from the upper end of the hydraulic cylinder during compression and extension cycles of the associated cylinder.

8 Claims, 3 Drawing Sheets

JOUNCE BUMPER PLATE

BACKGROUND OF THE INVENTION

The present invention relates generally to suspension systems and, more particularly, to jounce bumper plates for use with hydraulic dampers in vehicular suspension systems.

In automotive applications, hydraulic dampers are used in combination with coil springs to absorb relative displacements between a sprung component, such as an automotive vehicle body, and an unsprung component, such as a wheel assembly or vehicle chassis, to absorb the shock of impact sustained by the unsprung component. Vehicular suspension systems utilize various types of well-known hydraulic dampers including shock absorbers and struts.

In a typical strut suspension system, the strut is mounted between the vehicle chassis and the vehicle body. The strut typically includes a hydraulic cylinder with an attached piston and piston rod. The piston rod slidably extends from the upper end of the hydraulic cylinder and is connected to the vehicle body through a flexible connection. The hydraulic cylinder is attached to the vehicle chassis at the lower end of the cylinder. The impact of shocks from the road surface causes movement of the piston through fluid contained in the hydraulic cylinder. The resistance of movement of the piston through the cylinder is proportional to the rate of displacement, thereby damping the movement of the associated spring and preventing excessive bouncing of the vehicle body.

Since displacement of the vehicle chassis causes displacements of the strut, the strut undergoes cycles of compression and extension in response to the displacement of the vehicle chassis. Provision must be made for protecting the strut assembly and the vehicle body from the extreme jounce forces associated with severe irregularities in the road surface. A strut is typically provided with a jounce bumper mounted axially on the piston rod and a jounce bumper plate mounted on the upper end of the hydraulic cylinder. The jounce bumper is an elongated, generally cylindrical member of a compressible, elastomeric material that extends around the piston rod. During jounce motions of the strut, the damper bottoms out and the jounce bumper moves into contact with the jounce bumper plate and compresses to dissipate energy.

The jounce bumper and jounce bumper plate assembly are configured to protect the upper end of the hydraulic cylinder and the rod seal assembly. Jounce bumper plates are typically made of steel and are welded to the seal cover on the upper end of the hydraulic cylinder. An annular piston rod seal provides a fluid-tight seal between the seal cover and the piston rod to maintain the working fluid within the hydraulic cylinder. Jounce bumper plates typically have a central bore for receiving the piston rod and are configured to prevent damage to the rod seal from water and other contaminants. Dirt or moisture accumulating on the piston rod can be forced through the rod seal when the jounce bumper moves into contact with the jounce bumper plate and compresses the air between the jounce bumper plate and the seal cover. Therefore, jounce bumper plates typically provide a gap or channel between the jounce bumper plate and the seal cover that facilitates expulsion of contaminants and water that become trapped within the central bore of the jounce bumper plate.

Conventional jounce bumper plates are prone to deformation under the greater loads associated with recently developed active suspension systems and larger, heavier vehicles. Deformation of the jounce bumper plate around the seal cover inhibits the expulsion of water and other contaminants from the seal area and also results in a rough contact surface during the initial deflection of the jounce bumper. Therefore, there is a need for a jounce bumper plate which provides a smooth structural impact area for the jounce bumper with reduced plate deformation and improved wear characteristics at the jounce bumper/plate interface, allows proper venting to remove debris and other contaminants from the damper seal location, prolongs damper life by protecting the seal area of the damper and improves jounce bumper "entry feel" by providing a smooth interface where the jounce bumper contacts the jounce bumper plate.

SUMMARY OF THE INVENTION

The present invention is an improved jounce bumper plate for use with a damping module, which fulfills the needs of the prior art. The damping module is of a type having hydraulic cylinder having a cover at its upper end, a piston rod slidably extending from the upper end of the hydraulic cylinder and a jounce bumper attached to the piston rod. The jounce bumper plate is mounted on the upper end of the hydraulic cylinder. The jounce bumper plate has a central bore therethrough shaped to receive the piston rod of the cylinder and is shaped to form a series of peripheral arches extending about the outer edge of the jounce bumper plate. The upper surfaces of the arches provide a smooth structural impact area for the jounce bumper and are capable of withstanding significant jounce motions of the cylinder without permanent deformation. The arches provide gaps between the jounce bumper plate and the associated seal cover, thereby facilitating expulsion of water and other contaminants from the area adjacent to the damper seal.

Accordingly, it is an object of the present invention to provide a jounce bumper plate for a damping system which is capable of withstanding high loads without deformation; a jounce bumper plate which provides a smooth structural impact area for the jounce bumper; a jounce bumper plate which improves wear characteristics at the jounce bumper/ jounce bumper plate interface; a jounce bumper plate which provides venting to remove contamination from the damper seal location; and a jounce bumper plate which prolongs damper life by protecting the seal area of the damper; and improves jounce bumper "entry feel" by providing a smooth jounce bumper and jounce bumper plate interface.

Other objects and advantages of the present invention will be apparent from the following description, the accompanying drawings and the appended claims.

DESCRIPTION OF THE PREFERRED EMBODIMENT

Figure 1:
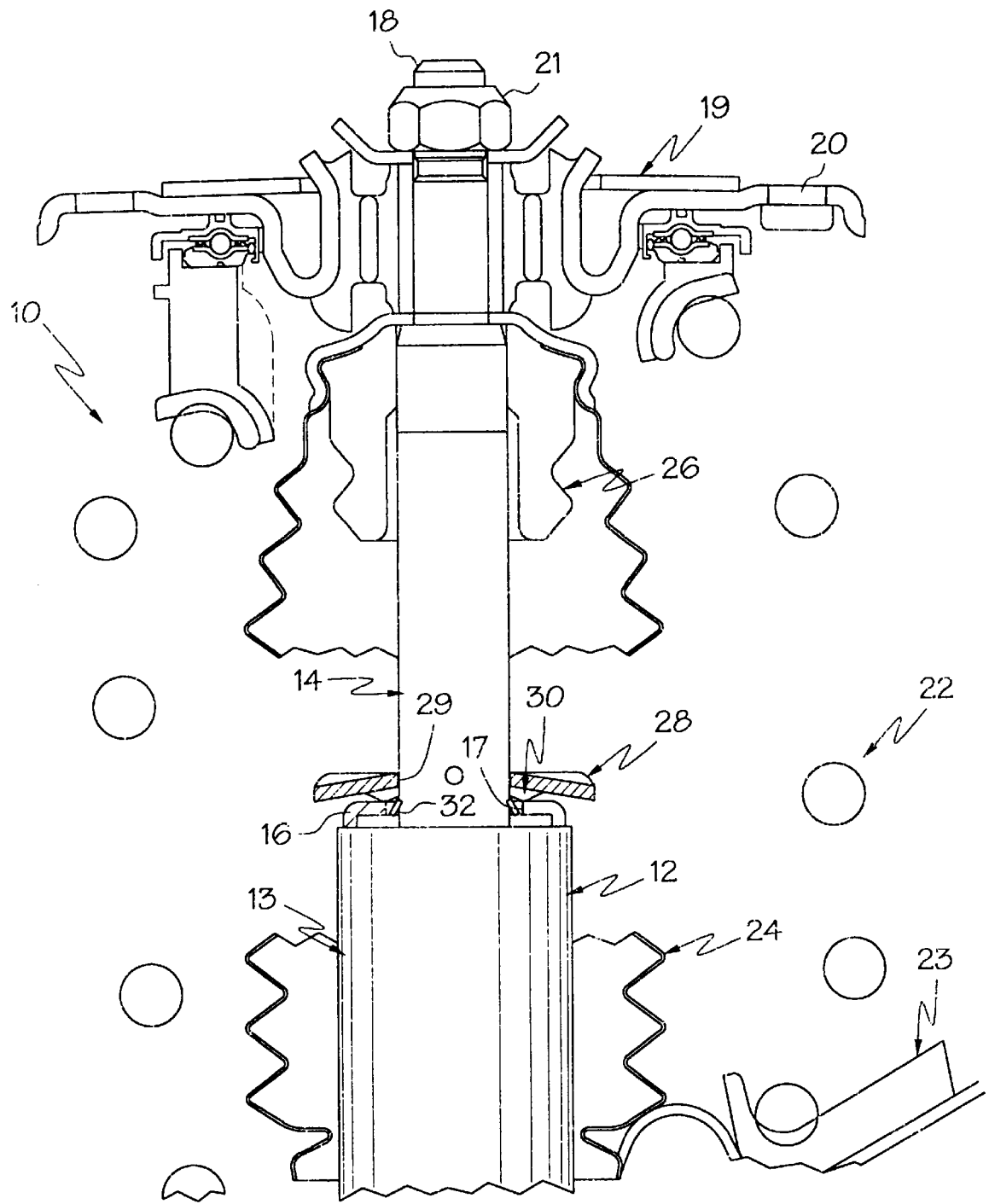
FIG. 1 is a partial side elevation in section of the upper portion of a damping module showing a preferred embodiment of the jounce bumper plate of the present invention.

As shown in FIG. 1, a strut module assembly for an automotive suspension system, generally designated 10, is operatively connected between the unsprung portion of a vehicle (not shown) and the sprung portion of a vehicle (not shown) in a well-known manner.

The suspension system 10 includes a hydraulic cylinder 12 having a reservoir tube 13 which provides a reservoir for hydraulic damping fluid. A cylindrical piston rod 14 extends along the central axis of the cylinder 12 and is attached at one end to a conventional valved piston (not shown) slidably mounted in a cylindrical inner tube (not shown) concentric with and spaced inwardly from the reservoir tube 13. Seal cover 16, welded or otherwise secured to the reservoir tube 13, closes the upper end of the hydraulic cylinder 12. The piston rod 14, which extends upwardly through an opening 17 in the seal cover 16, has a reduced diameter threaded portion 18. An upper support housing 19 is used to attach the strut assembly 10 to an automobile frame (not shown), usually by insertion of frame bolts 20 through corresponding openings in the automobile frame. The piston rod 14 is attached to the upper support housing by threadable connection of nut 21 secured to the piston rod upper threaded portion 18 extending through the upper support housing 19.

The strut module assembly 10 also includes a coil spring 22 mounted between the upper support housing 19 and a lower support housing 23 (partially 25 shown). An elastomeric boot 24 encloses the upper portion of the hydraulic cylinder 12. The boot 24 is mounted within the spring 22 and is secured to the upper support housing 19 and the lower support housing 23.

A generally cylindrical, elastomeric jounce bumper 26 is mounted on piston rod 14 and secured to the upper mount assembly 19. The jounce bumper 26 preferably is formed from a compressible foam or elastomeric material having a density of between 0.40–0.63 gm/cm$^3$. Under full jounce, the jounce bumper compresses to about 20% of its initial length.

A jounce bumper plate 28 is welded or otherwise secured to the seal cover 16 on the hydraulic cylinder 12. The jounce bumper plate 28 is generally configured as an annular disc having a central bore 29 shaped to receive the piston rod 14. Jounce bumper plate 28 is constructed such that a gap 30 is formed when the jounce bumper plate is secured to the seal cover. Moisture or other contaminants accumulating on top of the piston rod 14 are expelled through the gap 30 rather than being forced through the seal cover 16 and into the hydraulic cylinder 12. A fluid-tight elastomeric seal 32 is positioned between the piston rod 14 and the seal cover 16 on top of the reservoir tube 13 at the exit of the piston rod from the tube. The elastomeric seal 32 prevents dirt, water, and other contaminants from moving along the rod and subsequently passing through the seal cover and into the hydraulic cylinder 12. However, without the gap 30 between the seal cover 16 and the jounce bumper plate 28 dirt, moisture, or other contaminants could be forced past the seal 32 under the pressure generated during jounce contact between the jounce bumper 26 and the jounce bumper plate 28.

Figure 2:
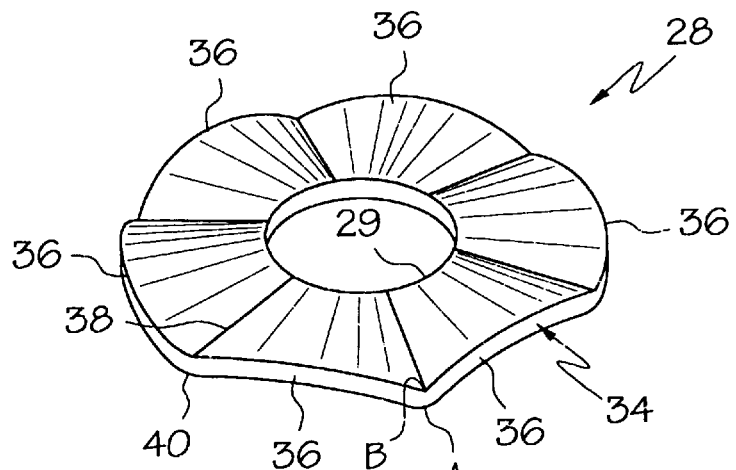
FIG. 2 is a perspective view of the jounce bumper plate shown in FIG. 1.
Figure 3:
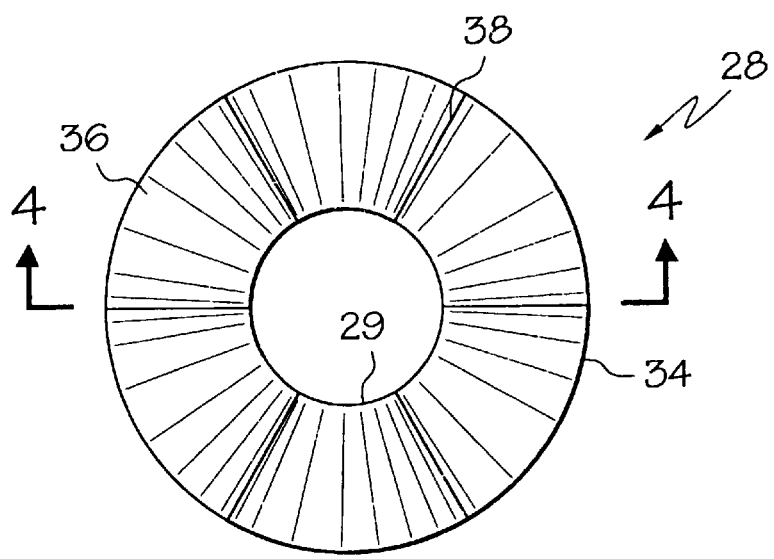
FIG. 3 is a top plan view of the jounce bumper plate of FIG. 2.
Figure 4:
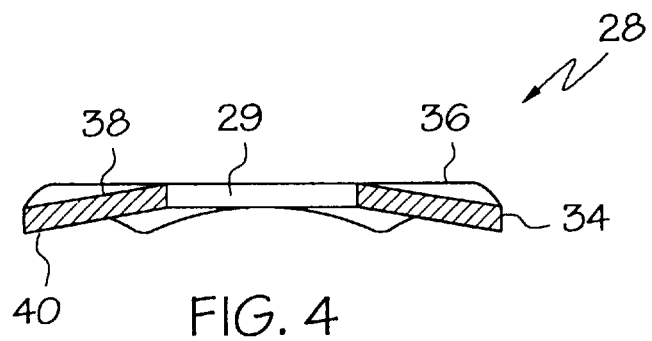
FIG. 4 is a side elevational view in section of the jounce bumper plate taken at line 4—4 of FIG. 3.

FIGS. 2, 3 and 4 show a preferred embodiment of the jounce bumper plate 28 of the present invention. The jounce bumper plate 28 of the invention is generally disc-shaped having a central bore 29 shaped to slidably receive the piston rod 14 of the damper (see FIG. 1) and a scallop-shaped outer periphery 34. A series of arches 36 extend from the central bore 29 to the outer periphery 34 and are defined by a plurality of linear creases 38 extending radially from the bore to the outer periphery 34. Adjacent arches 36 intersect at creases 38 formed in the top of the jounce bumper plate 28 and form corresponding radially-extending linear support surfaces 40 on the bottom of the plate.

In the preferred embodiment of the present invention, the jounce bumper plate 28 is constructed of steel having a gage of between about 2.5 to 3.5 mm, preferably 3.1 mm. Each support surface 40 forms an arc $\underline{A}$ at the outer circumferential edge 34 having an arc radius of between about 2 to 8 mm, preferably 4 mm. Each corresponding linear crease 38 on the top of the jounce bumper plate 28 forms an arc $\underline{B}$ at the outer circumferential edge 34 having an arc radius of between 0.5 to 2 mm, preferably 1 mm. Each arch 36 is an arc having an arc radius of between about 15 to 30 mm, and preferably between about 20 to 25 mm. A plane defined by the apex of each arch 36 on the top surface of the plate is essentially coplanar with the plane which includes the top of the plate adjacent to the central bore 29. The lower surfaces at the apex of each arch define a plane parallel to a plane defined by points located at the end of the linear support surfaces 40 at the outer circumferential edge 34 wherein the distance between the two planes is from about 2 to 6 mm, preferably from about 4.5 to 5.5 mm.

The continuously curved arches 36 provide a smooth, continuously-arching top surface of the jounce bumper plate 28 for the jounce bumper 26 (see FIG. 1) to contact during a jounce cycle. The smooth structural impact area for the jounce bumper 26 improves the wear characteristics at the jounce bumper/jounce plate interface and also improves the entry feel during the initial contact of the jounce bumper 26 with the jounce bumper plate 28.

The support surfaces 40 preferably are spot welded or otherwise mounted on the seal cover 16 (see FIG. 1) at a point on each support surface approximately midway between the central bore 29 and the outer circumferential edge 34. Arches 36 extending between adjacent contact points produce gaps 30 between the seal cover and the jounce bumper plate that facilitate expulsion of air and contaminants from around the seal cover area. The gap 30 formed by each arch 36 over the seal cover 16 has a height of at least 1 mm and preferably 2 mm as measured at the outer circumferential edge 34 of the jounce bumper plate 28 with respect to a plane formed by the top surface of the seal cover 16. The continuously curved arch configuration of the present jounce bumper 26 is better able to withstand high loads associated with active suspension systems without deformation. Accordingly, the gap 30 between the seal cover 16 and the jounce bumper plate 28 is maintained at its proper height and facilitates proper venting of the seal cover area to protect the seal from contaminants.

The jounce bumper plate 28 preferably is able to withstand 50,000 compression cycles at 40 kN load. In the preferred embodiment, the jounce bumper plate 28 is composed of steel although other materials such as plastic and composites may also be used. The number of arches preferably is six although any number of arches can be used provided that water and other contaminants around the seal cover area are properly expelled.

As an associated vehicle chassis and suspension is subjected to irregularities in the road surface, the piston rod 14 moves within hydraulic cylinder 12 to reduce the transmission of vibrations and noise to the associated vehicle body. During full jounce, the piston rod 14 nears the end of its compression stroke within the hydraulic cylinder 12 and the jounce bumper 26 engages the jounce bumper plate 28 to prevent metal to metal contact and damage to the hydraulic cylinder. Full compression of the strut and the corresponding full compression of the jounce bumper 26 as it impacts the jounce bumper plate 28 create significant air pressure which forces contaminants through the gap 30 between the seal cover 16 and the jounce bumper plate 28.

Figure 5:
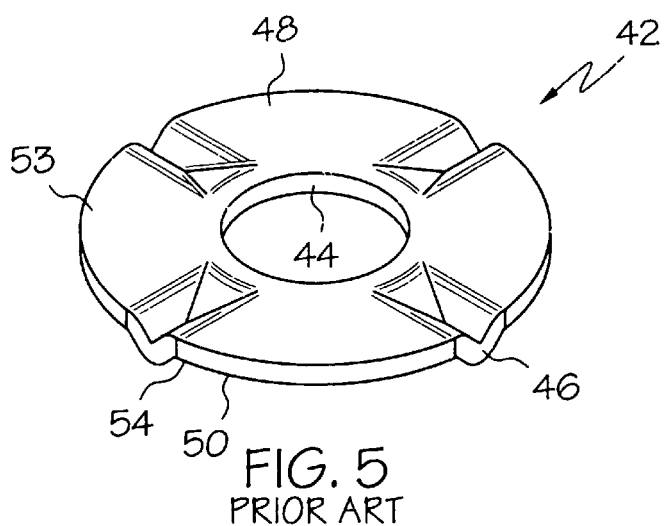
FIG. 5 is perspective view of a prior art jounce bumper plate.
Figure 6:
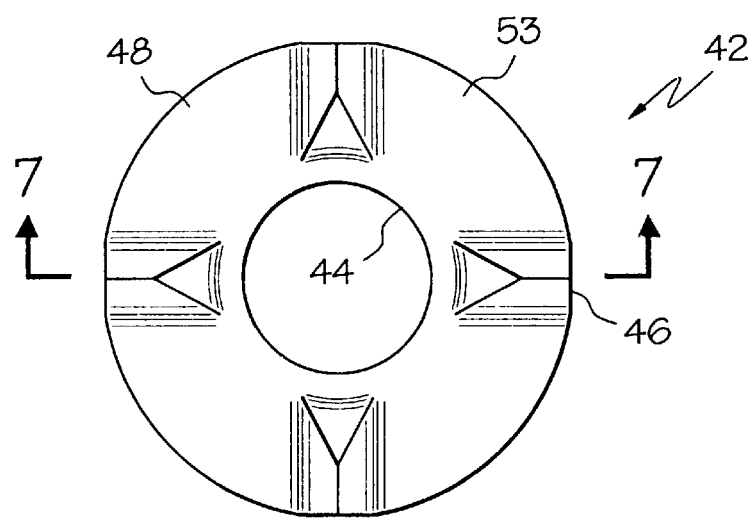
FIG. 6 is a top plan view of the jounce bumper plate of FIG. 5.
Figure 7:
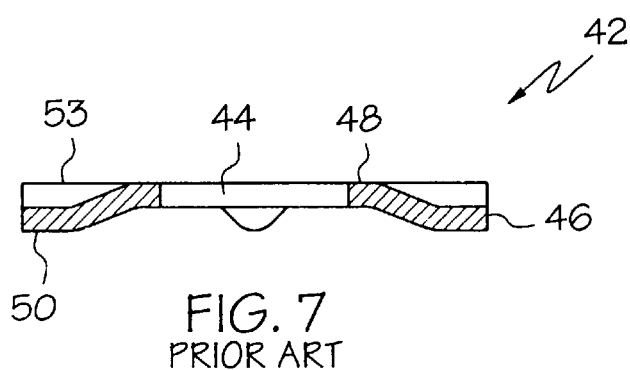
FIG. 7 is a side elevational view in section of the jounce bumper plate taken at line 7—7 of FIG. 6.

Details of a prior art jounce bumper plate are shown in FIGS. 5, 6 and 7. The prior art jounce bumper plate 42 is generally disc shaped having a central bore 44 shaped to slidably receive the piston rod 14 (see FIG. 1). The jounce bumper plate is generally flat, but also includes a plurality of indentations 46 extending from the top 48 to the bottom 50 of the jounce bumper plate. The indentations 46 produce corresponding mesas 53 on the top surface of the jounce bumper plate 42 which provide a contact surface for the jounce bumper 26 (see FIG. 1) under a jounce stroke. The bottom of the indentations 46 are spot welded to the top of the seal cover 16 thereby producing a plurality of gaps 54 (see FIG. 5) between the seal cover 16 and the jounce bumper plate 42. Under the greater loads associated with active suspension systems in current vehicles, prior art jounce bumper plate 42 can become permanently deformed. Such permanent deformation of bumper plate 42 typically takes the form of a collapsed outer periphery, which wraps downwardly and around the seal cover 16. A jounce bumper plate 42 thus deformed inhibits proper venting of the seal area and provides a rough surface during jounce bumper initial deflections (entry feel). A deformed prior art jounce bumper plate 42 also inhibits proper venting by restricting or completely sealing off the gaps 54 normally present between the seal cover 16 and the jounce bumper plate 42. Without proper venting, contaminants, such as dirt and moisture, tend to be forced past the seal 32 and into the hydraulic cylinder 12 under the air pressure generated during severe jounce. Contaminants forced through the seal 32 can damage the hydraulic cylinder 12 and the piston rod 14 resulting in fluid leakage from the hydraulic cylinder 12. Furthermore, the deformed jounce bumper plate presents a rough surface which causes corresponding disruptions in the initial deflections of the jounce bumper as it comes in contact with the jounce bumper plate (known as "entry feel"). The poor entry feel associated with the rough surface of the deformed jounce bumper plate results in undesirable vibrations being transmitted to the vehicle body.

Although the present invention has been described with reference to a preferred embodiment, those skilled in the art will recognize that changes may be made in form and detail without departing from the spirit and scope of the invention. The relative terms used in this description such as "top" and "bottom" are used for ease-of-reference and are not intended to limit the scope of the invention.

What is claimed is:

1. A damping module comprising a hydraulic cylinder with an upper end cover, a piston rod slidably extending from the upper end of said hydraulic cylinder, a jounce bumper mounted upon said piston rod and a jounce bumper plate, the bumper plate comprising a disk having a central bore therethrough shaped to receive said piston rod, said disk being formed to have a plurality of arches extending about a periphery thereof, each of said arches being shaped to form a gap between said jounce bumper plate and said hydraulic cylinder sufficient to facilitate the expulsion of moisture and contaminants from the upper end of said hydraulic cylinder during a compression of said damping module, wherein said arches increase in curvature from said central bore to said periphery radially along said disk.

2. A damping module comprising a hydraulic cylinder with an upper end cover, a piston rod sidably extending from the upper end of said hydraulic cylinder, a jounce bumper mounted upon said piston rod and a jounce bumper plate, the bumper plate comprising a disk having a central bore therethrough shaped to receive said piston rod, said disk being formed to have a plurality of arches extending about a periphery thereof, each of said arches being shaped to form a gap between said jounce bumper plate and said hydraulic cylinder sufficient to facilitate the expulsion of moisture and contaminants from the upper end of said hydraulic cylinder during a compression of said damping module, wherein adjacent ones of said arches meet to form a support surface.

3. The damping module of claim 2 wherein said support surface extends radially from said central bore.

4. A damping module comprising a hydraulic cylinder with an upper end cover, a piston rod slidably extending from the upper end of said hydraulic cylinder, a jounce bumper mounted upon said piston rod and a jounce bumper plate, said jounce bumper plate comprising an annular plate member having first and second opposing sides, an inner edge defining a central opening shaped to receive a piston rod therethrough, and an outer peripheral edge; said first and second sides defining a plurality of arches, adjacent ones of said arches intersecting to form radially extending support regions on said second side, wherein a circumferential dimension of each support region at said outer edge is substantially smaller than a circumferential dimension of said arches at said outer edge.

5. A damping module comprising a hydraulic cylinder with an upper end cover, a piston rod slidably extending from the upper end of said hydraulic cylinder, a jounce bumper mounted upon said piston rod and a jounce bumper plate, said jounce bumper plate comprising an annular plate member having first and second opposing sides, an inner edge defining a central opening shaped to receive a piston rod therethrough, and an outer peripheral edge; said first and second sides defining a plurality of arches, adjacent ones of said arches intersecting to form radially extending support regions on said second side, wherein said support regions at an outer periphery of said plate member define a first plane, lower surfaces of apexes of each of said arches define a second plane and the distance between said first and second planes is between about 4.5 to 5.5 mm.

6. A damping module comprising a hydraulic cylinder with an upper end cover, a piston rod slidably extending from the upper end of said hydraulic cylinder, a jounce bumper mounted upon said piston rod and a jounce bumper plate. said jounce bumper plate comprising:

an annular plate member having first and second opposing sides and substantially uniform thickness between said first and second opposing sides, an inner edge defining a central opening shaped to receive a piston rod therethrough, and an outer peripheral edge;

said first and second sides defining a plurality of smoothly curved arches beginning adjacent said inner edge and extending radially outward to said outer edge, each two adjacent ones of said smoothly curved arches being separated from each other by a linear crease beginning adjacent said inner edge and extending radially outward to said outer edge.

7. The damping module of claim 6, wherein said linear creases between adjacent smoothly curved arches begin in said plane of said inner edge and extend at an angle out of said plane to said outer edge.

8. A damping module comprising a hydraulic cylinder with an upper end cover, a piston rod slidably extending from the upper end of said hydraulic cylinder, a jounce bumper mounted upon said piston rod and a jounce bumper plate, said jounce bumper plate comprising:

an annular plate member having first and second opposing sides and substantially uniform thickness between said first and second opposing sides, an inner edge defining a central opening shaped to receive a piston rod therethrough, and an outer peripheral edge;

said first and second sides defining a plurality of smoothly curved arches beginning adjacent said inner edge and extending radially outward to said outer edge, each smoothly curved arch defining an apex extending radially along the uppermost portion thereof in a plane defined by the inner edge of the plate member.

* * * * *